US 12,554,310 B2

(12) United States Patent
Noguera Serra et al.

(10) Patent No.: US 12,554,310 B2
(45) Date of Patent: Feb. 17, 2026

(54) POWER REDUCTION IN AN ARRAY OF DATA PROCESSING ENGINES

(71) Applicants: XILINX, INC., San Jose, CA (US); Advanced Micro Devices, Inc., Santa Clara, CA (US)

(72) Inventors: Juan J. Noguera Serra, San Jose, CA (US); Akila Subramaniam, Austin, TX (US); David Kramer, Austin, TX (US); Madhusudan Chilakam, Boxborough, MA (US); Tim Tuan, San Jose, CA (US)

(73) Assignees: XILINX, INC., San Jose, CA (US); Advanced Micro Devices, Inc., Santa Clara, CA (US)

( * ) Notice: Subject to any disclaimer, the term of this patent is extended or adjusted under 35 U.S.C. 154(b) by 123 days.

(21) Appl. No.: 18/394,706

(22) Filed: Dec. 22, 2023

(65) Prior Publication Data
US 2025/0208687 A1 Jun. 26, 2025

(51) Int. Cl.
*G06F 1/32* (2019.01)
*G06F 1/3228* (2019.01)
*G06F 1/3237* (2019.01)
*G06F 1/3287* (2019.01)

(52) U.S. Cl.
CPC .......... *G06F 1/3237* (2013.01); *G06F 1/3228* (2013.01); *G06F 1/3287* (2013.01)

(58) Field of Classification Search
CPC ..... G06F 1/3237; G06F 1/3228; G06F 1/3287
See application file for complete search history.

(56) References Cited

U.S. PATENT DOCUMENTS

| 11,953,966 B1 * | 4/2024 | Wu | G06F 1/3237 |
| 2021/0034136 A1 * | 2/2021 | Hovis | G06F 1/3275 |

OTHER PUBLICATIONS

Clover, Juli, "Apple M1 Chip: Everything You Need to Know," Oct. 13, 2022, https://www.macrumors.com/guide/m1/.

\* cited by examiner

*Primary Examiner* — Stefan Stoynov
(74) *Attorney, Agent, or Firm* — Patterson + Sheridan, LLP

(57) ABSTRACT

Embodiments herein describe a hardware accelerator that includes multiple power or clock domains. For example, the hardware accelerator can include an array of data processing engines (DPEs) where different subsets of the DPEs (e.g., different columns, rows, or blocks) are disposed in different power or clock domains within the hardware accelerator. When one or more subsets of the DPEs are idle (e.g., the hardware accelerator has not assigned any tasks to those DPEs), the accelerator can deactivate the corresponding power or clock domain (or domains), which deactivates the DPEs in those domains while the DPEs in the other power or clock domains remain operational. As such, idle DPEs can be deactivated to conserve energy while DPEs with work can remain operational.

19 Claims, 9 Drawing Sheets

POWER REDUCTION IN AN ARRAY OF DATA PROCESSING ENGINES

TECHNICAL FIELD

Examples of the present disclosure generally relate to establishing different power or clock domains in an array of data processing engines (DPEs) in a hardware accelerator.

BACKGROUND

Typically, a hardware accelerator is an input/output (IO) device that is communicatively coupled to a central processing unit (CPU) via a PCIe connection. The CPU and hardware accelerator can use direct memory access (DMA) and other communication techniques to share data.

Efforts have been made in recent years to bring the CPU logically closer to hardware accelerators by making the hardware accelerator cache coherent with the CPU. This provides additional options for transmitting data between the components. However, despite these efforts, the CPU and hardware accelerator are still separate components disposed on separate substrates (e.g., on different chips or different printed circuit boards (PCBs)) that use off-chip communication techniques such as PCIe to exchange data.

SUMMARY

One embodiment described herein is a system on a chip (SoC) that includes at least one central processing unit (CPU) and a hardware accelerator that includes data processing engines (DPEs) where a first subset of the DPEs is in a first power or clock domain and a second subset of the DPEs is in a second power or clock domain and the SoC is configured to deactivate the first power or clock domain to disable the first subset of DPEs while the second power or clock domain remains active so that the second subset of DPEs remain operational. The SoC also includes an interface communicatively coupling the CPU to the hardware accelerator.

One embodiment described herein is a method that includes determining a first subset of a plurality of DPEs in a hardware accelerator are idle where the first subset of DPEs is in a first power or clock domain and a second subset of the plurality of DPEs is in a second power or clock domain; deactivating the first power or clock domain but not the second power or clock domain so that the first subset of DPEs is disabled but the second subset of DPEs remains operational; determining, after deactivating the first power or clock domain, that the first subset of DPEs has work; and activating the first power or clock domain so the first subset of DPEs is operational to perform the work.

One embodiment described herein is a system that includes an IC that includes a hardware accelerator comprising an array of DPEs where a first subset of the DPEs is in a first power or clock domain and a second subset of the DPEs is in a second power or clock domain and where the IC is configured to deactivate the first power or clock domain to disable the first subset of DPEs while the second power or clock domain remains active so that the second subset of DPEs remain operational, and a memory controller. The system also includes at least one memory coupled to the memory controller in the IC.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
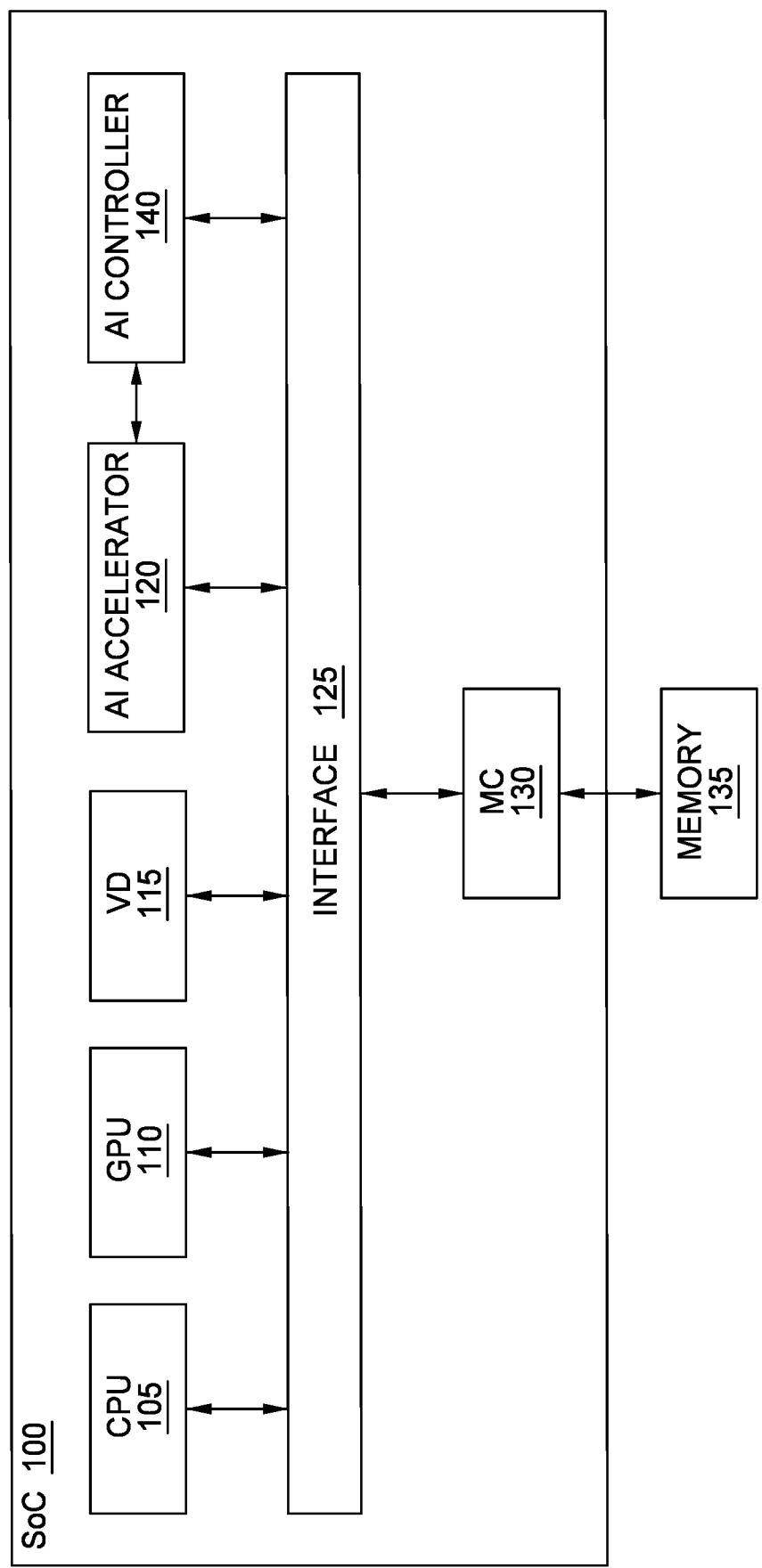
FIG. 1 illustrates a system on a chip (SoC) with an AI accelerator, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a hardware accelerator that includes multiple power domains. For example, the hardware accelerator can include an array of data processing engines (DPEs) which include circuitry for performing acceleration tasks (e.g., artificial intelligence (AI) tasks, data encryption tasks, data compression tasks, and the like). The DPEs are interconnected to permit them to share data when performing the acceleration tasks. Different subsets of the DPEs (e.g., different columns, rows, or blocks) are disposed in different power domains within the hardware accelerator. That way, when one or more subsets of the DPEs are idle (e.g., the hardware accelerator has not assigned any tasks to those DPEs), the corresponding power domain (or domains) can be powered down while power domains containing DPEs that do have worked assigned to them remain powered. As such, idle DPEs can be powered down to conserve energy while DPEs with work can remain operational.

In another embodiment, a hardware accelerator can include multiple clock domains. In this example, different subsets of the DPEs (e.g., different columns, rows, or blocks) are disposed in different clock domains within the hardware accelerator. Clock gating circuitry can be used to determine when to gate (e.g., block) the clock signal transmitted to one of the clock domains. That way, when one or more subsets of the DPEs are idle (e.g., the hardware accelerator has not assigned any tasks to those DPEs), the clock gating circuitry can gate the clock signal corresponding to the clock domain (or domains), which deactivates the DPEs in those domains while the clock gating circuitry does not gate the clock signal to the other clock domains so the corresponding DPEs remain operational. As such, idle DPEs can be deactivated to conserve energy while DPEs with work remain operational.

In one embodiment, the hardware accelerator is integrated into a same SoC (or same chip or integrated circuit (IC)) as a CPU. Thus, instead of relying on off-chip communication techniques, on-chip communication techniques such as an interconnect (e.g., a network-on-chip (NoC)) can be used to facilitate communication between the hardware accelerator and the CPU. This can result in faster communication between the hardware accelerator and the CPU. Moreover, a tighter integration between the CPU and hardware accelerator can make it easier for the CPU to offload tasks to the hardware accelerator.

FIG. 1 illustrates a SoC 100 with an AI accelerator 120, according to an example. The SoC 100 can be a single IC or a single chip. In one embodiment, the SoC 100 includes a semiconductor substrate on which the illustrated components are formed using fabrication techniques.

The SoC 100 includes a CPU 105, GPU 110, video decoder (VD) 115, AI accelerator 120, AI controller 140, interface 125, and memory controller (MC) 130. However, the SoC 100 is just one example of integrating an AI accelerator 120 and AI controller 140 into a shared platform with the CPU 105. In other examples, a SoC may include fewer components than what is shown in FIG. 1. For example, the SoC may not include the VD 115 or an internal GPU 110. However, in other examples, the SoC may include additional components than the ones shown in FIG. 1. Thus, FIG. 1 is just one example of components that can be integrated into a SoC with the AI accelerator 120 and the AI controller 140.

The CPU 105 can represent any number of processors where each processor can include any number of cores. For example, the CPU 105 can include processors arranged in array, or the CPU 105 can include an array of cores. In one embodiment, the CPU 105 is an x86 processor that uses a corresponding complex instruction set. However, in other embodiments, the CPU 105 may be other types of CPUs such as an Advanced Reduced Set Instruction Computer (RSIC) Machine (ARM) processor.

The GPU 110 is an internal GPU 110 that performs accelerated computer graphics and image processing. The GPU 110 can include any number of different processing elements. In one embodiment, the GPU 110 can perform non-graphical tasks such as training an AI model or cryptocurrency mining.

The VD 115 can be used for decoding and encoding videos.

The AI accelerator 120 can include any hardware circuitry that is designed to perform AI tasks, such as inference. In one embodiment, the AI accelerator 120 includes an array of DPEs that performs calculations that are part of an AI task. These calculations can include math operations or logic operations (e.g., bit shifts and the like). The details of one implementation of the AI accelerator 120 are discussed in FIG. 2.

The AI controller 140 is shown as being separate from the AI accelerator 120, but can be considered as part of the AI accelerator 120. In this example, the AI controller 140 has its own data connection to the interface 125. As such, the CPU 105 can transmit instructions to the AI controller 140 to perform an AI task. The AI controller 140 is also communicatively coupled to the AI accelerator 120 so the controller 140 can configure the DPEs in the accelerator 120 to perform the task (e.g., an inference or training task). Further, the AI controller 140 can use the interface 125 to communicate with the CPU 105, such as informing the CPU 105 when an AI task is complete.

In one embodiment, the AI controller 140 is a microprocessor, and as such, is separate from the CPU 105. The AI controller 140 can be hardened circuitry that executes software code (or firmware) that controls the AI accelerator 120. In one embodiment, the only task of the AI controller 140 is to control and orchestrate the functions performed by the AI accelerator 140. However, in other embodiments, other tasks may be performed by the AI controller 140, such as moving data into and out of the AI accelerator. For example, the AI controller 140 may communicate with the MC 130 to store data in, or retrieve data from, the memory 135. In another example, if there are currently no AI tasks to perform, the AI controller 140 may be used to do tasks that are unrelated to AI, such as serving as an ancillary processor for the CPU 105. In this example, the AI controller 140 may execute different specialized code depending on the task the CPU 105 has currently assigned to it. Further details of the AI accelerator 120 and the AI controller 140 are provided in the figures below.

The SoC 100 also includes one or more MCs 130 for controlling memory 135 (e.g., random access memory (RAM)). While the memory 135 is shown as being external to the SoC 100 (e.g., on a separate chip or chiplet), the MCs 130 could also control memory that is internal to the SoC 100.

The CPU 105, GPU 110, VD 115, AI accelerator 120, AI controller 140, and MC 130 are communicatively coupled using an interface 125. Put differently, the interface 125 permits the different types of circuitry in the SoC 100 to communicate with each other. For example, the CPU 105 can use the interface 125 to instruct the AI controller 140 to perform an AI task. The AI accelerator 120 and/or the controller 140 can use the interface 125 to retrieve data (e.g., input for the AI task) from the memory 135 via the MC 130, process the data to generate a result, store the result in the memory 135 using the interface 125, and then inform the CPU 105 that the AI task is complete using the interface 125.

In one embodiment, the interface 125 is a NoC, but other types of interfaces such as internal buses are also possible.

Figure 2:
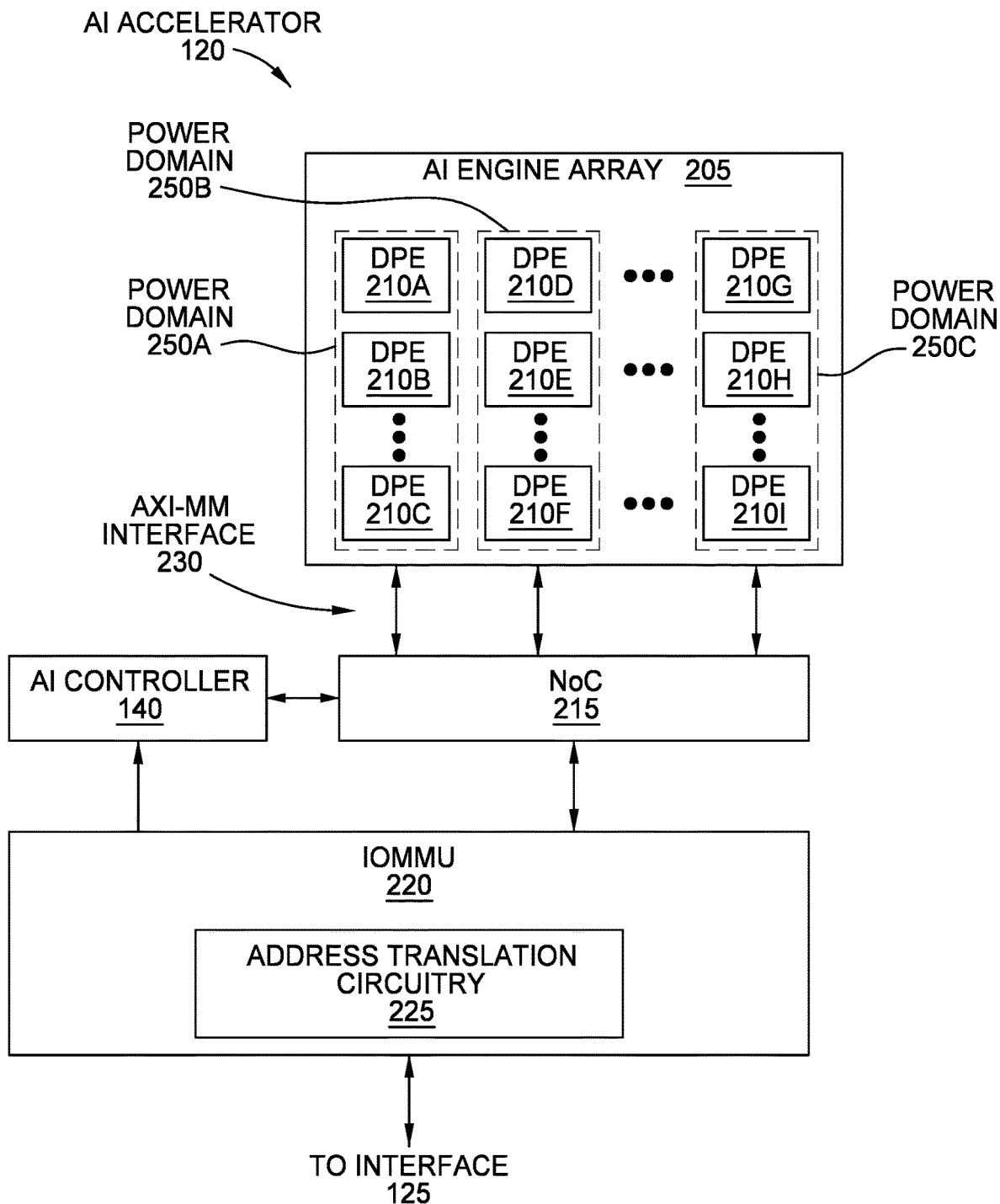
FIG. 2 illustrates an AI accelerator with different power domains, according to an example.

FIG. 2 illustrates the AI accelerator 120, according to an example. The AI accelerator 120 can also be described as an inference processing unit (IPU) but is not limited to performing AI inference tasks.

Figure 5:
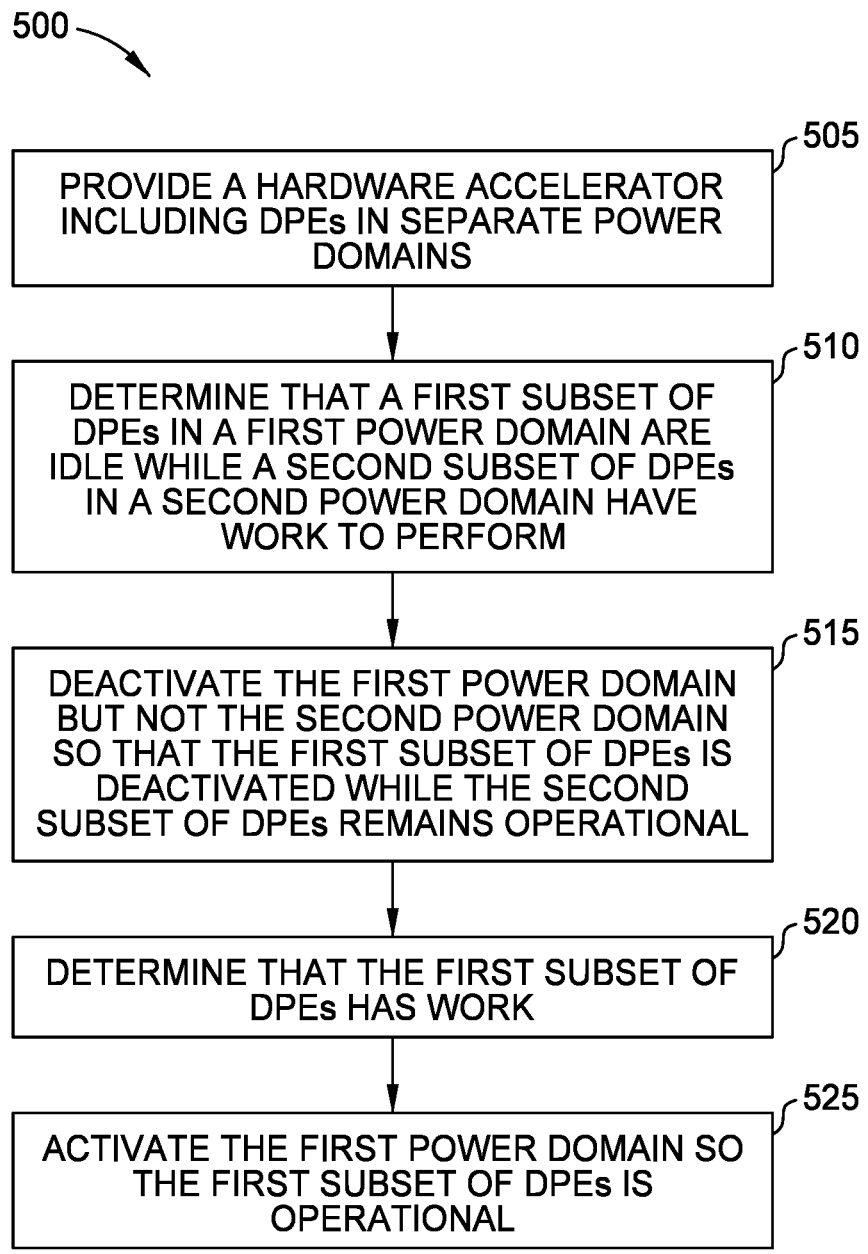
FIG. 5 illustrates a workflow for operating power domains in a hardware accelerator, according to an example.

The accelerator 120 includes an AI engine array 205 that includes a plurality of DPEs 210 (which can also be referred to as AI engines). The DPEs 210 may be arranged in a grid, cluster, or checkerboard pattern in the SoC 100 in FIG. 1—e.g., a 2D array with rows and columns. Further, the array 205 can be any size and have any number of rows and columns formed by the DPEs 210. One example layout of the array 205 is shown in FIG. 5.

In one embodiment, the DPEs 210 are identical. That is, each of the DPEs 210 (also referred to as tiles or blocks) may have the same hardware components or circuitry. In one embodiment, the array 205 includes DPEs 210 that are all the same type (e.g., a homogeneous array). However, in another embodiment, the array 205 may include different types of engines.

Regardless if the array 205 is homogenous or heterogeneous, the DPEs 210 can include direct connections between DPEs 210 which permit the DPEs 210 to transfer data directly to neighboring DPEs. Moreover, the array 205 can include a switched network that uses switches that facilitate communication between neighboring and non-neighboring DPEs 210 in the array 205.

In one embodiment, the DPEs 210 are formed from software-configurable hardened logic—i.e., are hardened. One advantage of doing so is that the DPEs 210 may take up less space in the SoC relative to using programmable logic to form the hardware elements in the DPEs 210. That is, using hardened logic circuitry to form the hardware elements in the DPE 210 such as program memories, an instruction fetch/decode unit, fixed-point vector units, floating-point vector units, arithmetic logic units (ALUs), multiply accumulators (MAC), and the like can significantly reduce the footprint of the array 205 in the SoC. Although the DPEs 210 may be hardened, this does not mean the DPEs 210 are not programmable. That is, the DPEs 210 can be configured when the SoC is powered on or rebooted to perform different AI functions or tasks.

While an AI accelerator 120 is shown, the embodiments herein can be extended to other types of integrated accelerators. For example, the accelerator could include an array of DPEs for performing other tasks besides AI tasks. For instance, the DPEs 210 could be digital signal processing engines, cryptographic engines, Forward Error Correction (FEC) engines, or other specialized hardware for performing one or more specialized hardware acceleration tasks. In that case, the accelerator could be a cryptography accelerator, compression accelerator, and so forth.

In this example, the DPEs 210 in the array 205 use the Advanced eXtensible Interface (AXI) memory-mapped (MM) interface 230 to communicate with a NoC 215. AXI is an on-chip communication bus protocol that is part of the Advanced Microcontroller Bus Architecture (AMBA) specification. An AXI MM interface 230 is used (rather than a AXI streaming interface) to transfer data between the DPEs 210 and the NoC 215 to access external memory, which requires using physical memory addresses. As discussed in FIG. 4 below, the DPEs can communicate with each other using a streaming protocol or interface (e.g., AXI streaming which does not use memory addresses) but a memory mapped protocol or interface (e.g., AXI MM) is used when transmitting data external to the array 205. In one embodiment, the array 205 can include interface tile (such as the interface tile 504 discussed in FIG. 5) that include primary and secondary DMA interfaces for transmitting data into and out of the array. When receiving data from the NoC 215, the interface tiles in the array 205 can transform the data into AXI streaming data.

In one embodiment, a memory mapped interface is also used to communicate between the NoC 215 and the IOMMU 220, and between the IOMMU 220 and the interface 125. However, these interfaces may be different types of memory mapped interfaces. For example, the interface between the NoC 215 and the IOMMU 220 may be AXI-MM, while the interface between the IOMMU 220 and the interface 125 is a different type of memory mapped interface. While AXI is discussed as one example herein, any suitable memory mapped and streaming interfaces may be used.

The NoC 215 may be a smaller interface than the interface 125 in FIG. 1. For example, the NoC 215 may be a miniature NoC when compared to using a NoC to implement the interface 125 in FIG. 1. The NoC 215 permits the DPEs 210 in the different columns of the AI engine array 205 to communicate with an Input-Output Memory Management Unit (IOMMU) 220. The NoC 215 can include a plurality of interconnected switches. For example, the switches may be connected to their neighboring switches using north, east, south, and west connections.

In one embodiment, the data in the AI accelerator 120 is tracked using virtual memory addresses. However, other circuitry in the SoC 100 (e.g., caches in the CPUs 105, memory in the GPUs 110, the MC 130, etc.) may use physical memory addresses to store the data. The IOMMU 220 includes address translation circuitry 225 to perform memory address translation on data that flows into, and out of, the AI accelerator 120. For example, when receiving data from other circuitry in the SoC (e.g., from the MCs 130) via the interface 125, the address translation circuitry 225 may perform a physical-to-virtual address translation. When transmitting data from the AI accelerator 120 to be stored in the SoC or external memory 135 using the interface 125, the address translation circuitry 225 performs a virtual-to-physical address translation. For example, when using AXI-MM, the address translation circuitry 225 performs a translation between AXI-MM virtual addresses to physical addresses used to store the data in external memory or caches. While FIG. 2 illustrates using an IOMMU, the address translation function may be implemented using any suitable type of address translation circuitry.

FIG. 2 also includes the AI controller 140 which is coupled to the NoC 215. As mentioned above, the AI controller 140 is a processor (e.g., a light-weight processor when compared to the CPU) which controls the DPEs 210. For example, the AI controller 140 may program or configure the DPEs 210 to perform an inference AI task. This may include configuring the DPEs 210 to perform a series of operations. For instance, the DPEs 210 may pass data between them in order to perform the AI task.

In this example, the AI controller 140 relies on the NoC 215 to communicate to, and configure, the DPEs 210. After the DPEs 210 have performed the task, the AI controller 140 can inform the CPU using the interface 125, via the IOMMU 220. However, in other embodiments, rather than communicating through the IOMMU 220 to reach the interface 125, the AI controller 140 may bypass the IOMMU 220 when communicating with the interface 125.

Further, the controller 140 may be used even when the accelerator is not an AI accelerator. For example, any type of accelerator (e.g., cryptography accelerator or compression accelerator) that has an array of DPEs 210 can rely on the controller 140 to orchestrate the DPEs to perform acceleration tasks assigned by the CPU. Thus, while an AI accelerator and controller are shown in FIGS. 1 and 2, the embodiments herein are not limited to such and can apply to any type of accelerator with DPEs.

FIG. 2 illustrates arranging the DPEs 210A-1 into an array, formed from rows and columns. In this example, each column of DPEs 210 is disposed in a different power domain 250. That is, the first column of DPEs 210 is in power domain 250A, the second column of DPEs 210 is in the power domain 250B, and the last column of DPEs 210 is in the power domain 250C. Placing the columns in different power domains 250 results in the AI controller 140 being able to selectively turn off each of the power domains 250, thereby deactivating the DPEs within that power domain. For example, the AI accelerator 120 may currently be tasked with performing an AI task that uses the DPEs 210A-F in the first two columns but does not use the DPEs 210G-I in the last column. The AI controller 140 (or some other logic in the SoC, such as the CPU) can turn off the power domain 250C since those DPEs 210G-I are idle. This conserves power in the AI accelerator 120. The DPEs 210 in the power domains 250A and 250B remain operational (or active) and can perform the AI task.

As shown, the DPEs 210 are in different power domains, but in one embodiment the power domains 250 are coupled to the same power source or voltage source (e.g., VDD). For example, the power domains 250 may be coupled to the power source using switches (e.g., transistors). The switches can be individually controlled to selectively deactivate the power domains 250. However, in other embodiments, the power domains 250 may be coupled to different power/voltage sources, and thus, could be driven using different voltages, rather than the same voltage.

While FIG. 2 illustrates grouping the DPEs 210 in the same column in the same power domain, this is just one example. In other examples, the DPEs in two columns, three columns, etc. may be grouped in the same power domain. In another example, the DPEs 210 in the same row (or adjacent rows) may be grouped in the same power domain. In yet another example, blocks of DPEs that includes DPEs from multiple columns and rows (e.g., 2×2 blocks of DPEs, or 3×3 blocks of DPEs) may be assigned to different power domains.

In addition to dividing the DPEs 210 into different power domains, in one embodiment, the other components in the AI accelerator 120 can be disposed in different power domains. For example, the AI controller 140, the NoC 215, and the IOMMU 220 can be in a different power domain than the power domains 250 in the AI engine array 205. Placing the circuitry in different power domains permit the SoC to power down some, or all, of the DPEs 210 in the array 205 while the other circuitry in the AI accelerator 120 remains operational. For example, if the AI engine array 205 does not currently have an AI task assigned to it from the CPU, the AI controller 140 (or some other logic in the SoC) can turn off or deactivate the power domains 250 in the array 205. Put differently, when the DPEs 210 are idle, the AI controller 140 can turn off the power domains 250 which conserves power. While the power domains 250 are deactivated, the power domain containing the AI controller 140, the NoC 215, and the IOMMU 220 can remain turned on. This permits this circuitry in the AI accelerator 120 to continue to operate while the DPEs 210 are deactivated.

In other embodiments, the NoC 215 and the IOMMU 220 may both be in the same power domain as one of the power domains 250 in the AI engine array 205 while only the AI controller 140 is in a separate power domain. As such, turning off a power domain could deactivate a subset of the DPEs 210 in the array 205 as well as the NoC 215 and the IOMMU 220. In yet another example, the NoC 215 may be in one of the power domains 250 in the array 205 while the IOMMU 220 and the AI controller 140 are in a separate power domain.

Figure 3:
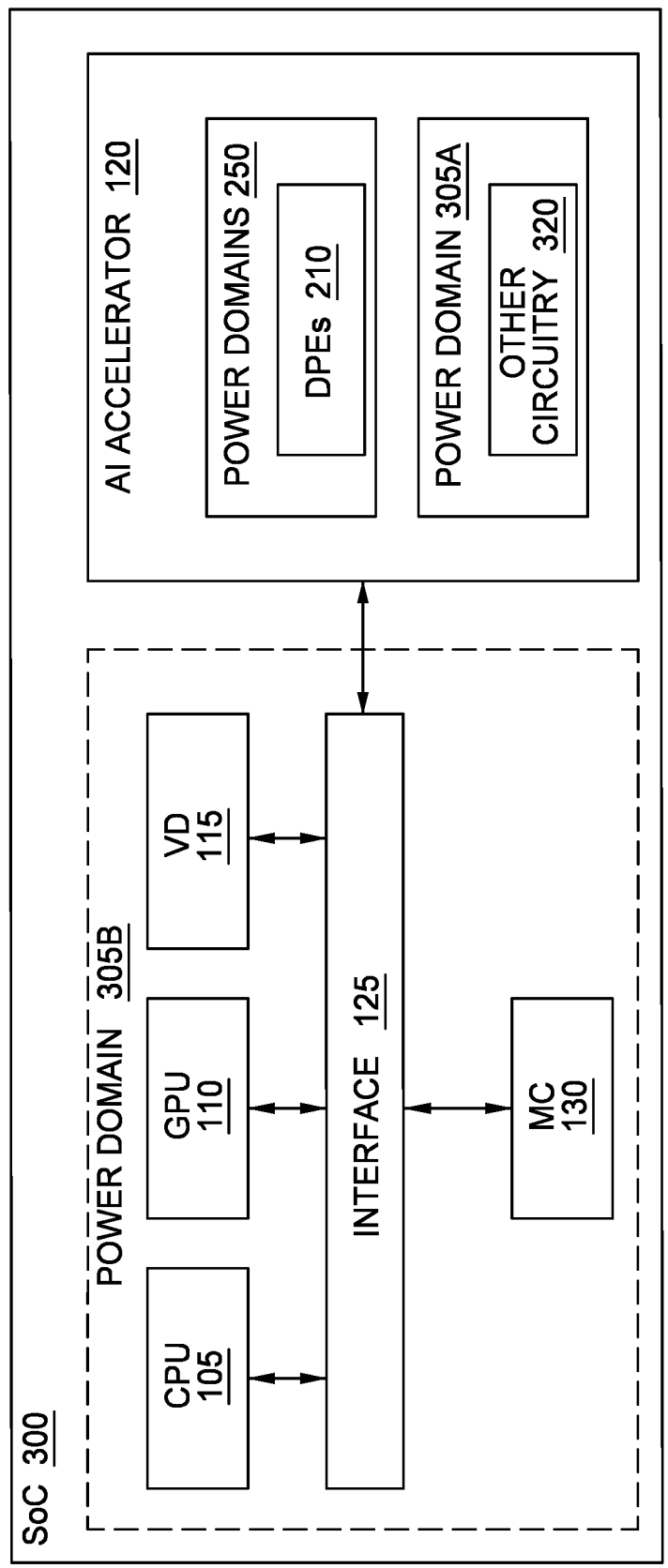
FIG. 3 illustrates a SoC with different power domains, according to an example.

FIG. 3 illustrates a SoC 300 with different power domains, according to an example. The SoC 300 has many of the same components as shown in the SoC 100 in FIG. 1, which is indicated by using the same reference numbers. In addition, the SoC 300 illustrates that the circuitry in the SoC 300 separate from the AI accelerator 120 can be assigned to a different power domain—i.e., power domain 305B.

In this example, the AI accelerator 120 has the power domains 250 which divide up the DPEs 210, and at least one other power domain 305A that contains other circuitry 320 in the AI accelerator 120. The other circuitry 320 can include a controller, NoC, IOMMU, and the like. As discussed in FIG. 2, by dividing the circuitry in the AI accelerator 120 into different power domains 250 and 305A, this permits the DPEs 210 and the other circuitry 320 to be selectively powered down while the circuitry in the other power domain(s) remain operational. Of course, the AI accelerator 120 may be able to disable the power domains 250 and the power domain 305A at the same time, in which case, the AI accelerator 120 as a whole would be deactivated (or powered down).

In this example, the remaining circuitry in the SoC 300—i.e., the circuitry that is not in the AI accelerator 120—is disposed in the power domain 305B. Thus, the SoC 300 can power down one, or both, of the power domains 250 and 305A in the AI accelerator 120 without affecting the circuitry in the power domain 305B (i.e., the CPU 105, the GPU 110, the VD 115, the interface 125, and the MC 130). While FIG. 3 illustrates placing the CPU 105, the GPU 110, the VD 115, the interface 125, and the MC 130 in the power domain 305B, these components may also be disposed in different power domains (e.g., the VD 115 or the GPU 110 may be disposed in a power domain different from the CPU 105) so they can be selectively turned off.

Further, in an alternative embodiment, the circuitry in the AI accelerator 120 may be disposed in the same power domain as circuitry that is separate from the AI accelerator 120. For example, the other circuitry 320 in the AI accelerator 120 may be part of the power domain 305B. For instance, the controller, NoC, and IOMMU in the AI accelerator 120 can be in the same power domain as the CPU 105, GPU 110, VD, 115, interface 125, and the MC 130.

Figure 4:
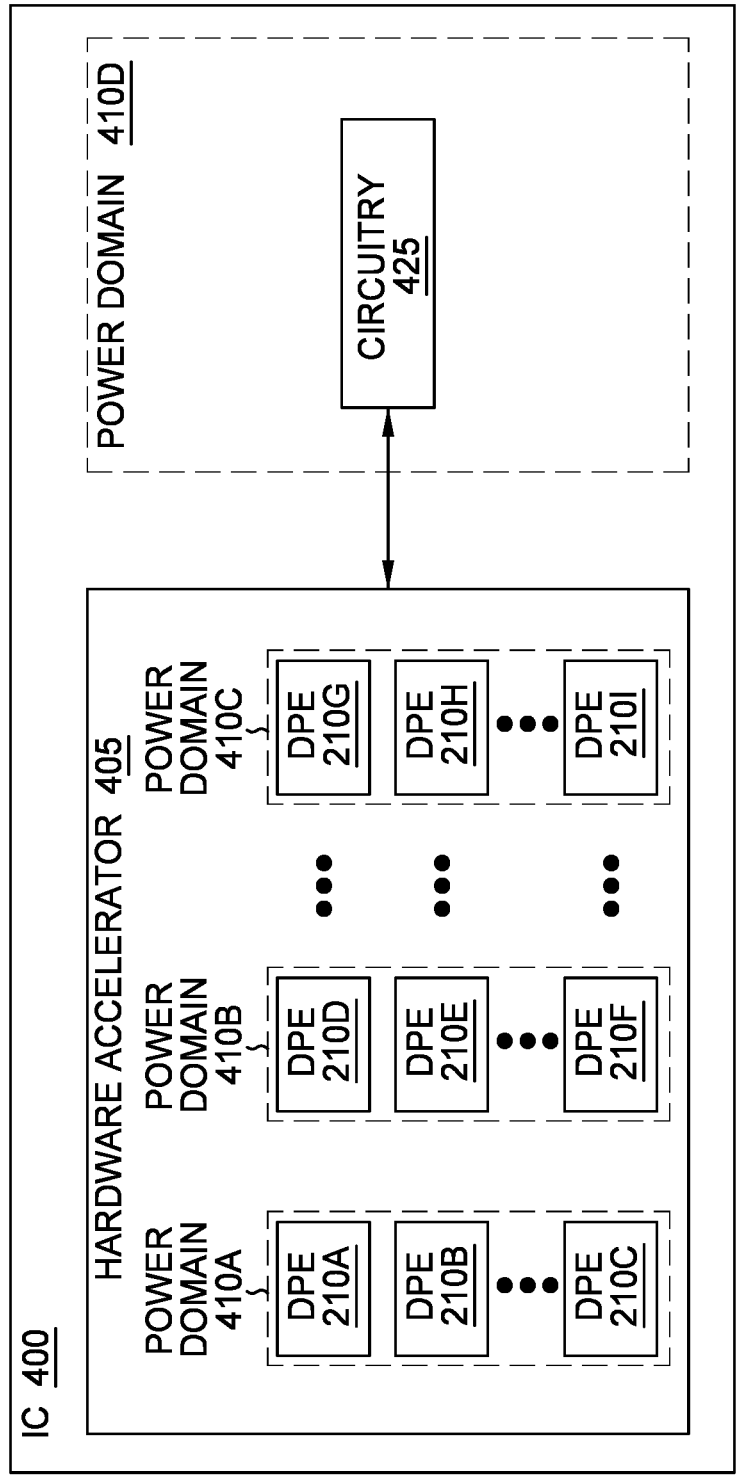
FIG. 4 illustrates an integrated circuit with different power domains, according to an example.

FIG. 4 illustrates an IC 400 with different power domains 410, according to an example. The IC 400 includes a hardware accelerator 405 and circuitry 425. The hardware accelerator 405 can be an AI accelerator, encryption accelerator, compression accelerator, and the like.

The hardware accelerator 405 includes DPEs 210 disposed in power domains 410A-C which the circuitry 425 is disposed in a power domain 410D. In one embodiment, the circuitry 425 is a different type of circuitry than the DPEs 210. As such, the embodiments herein include putting different types of circuitry in different power domains 410. Further, the embodiments herein can apply to different types of hardware accelerators, not just AI accelerators.

In addition, FIG. 4 illustrates that the hardware accelerator 405 can be integrated into the same IC 400 as the circuitry 425, which is in power domain 410D. The circuitry 425 can include another accelerator, a CPU, a GPU, an I/O interface (e.g., a Serializer/Deserializer (SerDes) interface, transceiver, analog to digital convertor, digital to analog converter, and the like), a VD, a NoC, a MC or combinations thereof. Thus, the hardware accelerator 405 can be assigned to different power domains from circuitry 425 that is on the same IC 400 as the accelerator 405. If the circuitry 425 includes a MC, the IC 400 can be coupled to a memory that is on a separate IC than the IC 400.

However, in another embodiment, the circuitry 425 can share the same power domain as circuitry in the hardware accelerator 405. For example, the circuitry 425 can be in the power domain 410C along with a corresponding subset of the DPEs (i.e., DPEs 210G-210I) in the hardware accelerator 405.

FIG. 5 illustrates a workflow of a method 500 for operating power domains in a hardware accelerator, according to an example. At block 505, a hardware accelerator (e.g., the hardware accelerator 405 in FIG. 4 or the AI accelerator 120 in FIG. 1) is provided that includes DPEs in separate power domains. Because the DPEs are in separate power domains, subsets of DPEs can be powered down while other subsets of DPEs can remain operational. The subsets of DPEs (which are each disposed in a different power domain) can include one column of DPEs, multiple adjacent columns of DPEs, one row of DPEs, multiple adjacent rows of DPEs, blocks of DPEs which includes adjacent DPEs from multiple columns and rows, and the like.

At block 510, the controller in the hardware accelerator (or a CPU or other logic in the same IC as the accelerator) determines that a first subset of DPEs is idle while a second subset of DPEs in a second power domain has work to perform. For example, the hardware accelerator may currently be processing a task for the CPU that does not require all the DPEs to perform. For example, an AI task may need to use only half of the DPE array, or a task may be a relatively light-weight task that does not need the full compute power of the DPE array. Thus, the controller may determine that only a portion of the DPEs in the array will be used to perform the task. As such, at least one subset of the DPEs will be idle while another subset of the DPEs will perform the work.

At block 515, the controller deactivates (turns off) the first power domain but not the second power domain so that the first subset of DPEs is disabled while the second subset of DPEs remains operational. That is, the controller keeps the second power domain powered on. This conserves power in the hardware accelerator while permitting the hardware accelerator to still perform the assigned task. While method 500 describes turning off one power domain, any number of power domains can be powered off in parallel. For example, if the task requires only half of the DPEs to perform and the DPE array includes four power domains containing equal numbers of DPEs, the controller can turn off two of the power domains while the other two power domains remain powered on.

At block 520, the controller determines that the first subset of DPEs has work. For example, the CPU may send a new accelerator task to the controller that requires the first subset and the second subset of the DPEs to complete.

At block 525, the controller activates (turns on) the first power domain so the first subset of DPEs is operational. The first subset and the second subset of the DPEs are then able to perform the work assigned by the CPU. For example, the controller may orchestrate the DPEs in order to perform the task assigned by the CPU. In this manner, different subsets of the DPEs in the DPE array can be powered down when idle but then powered up when new work is assigned to the hardware accelerator.

Further, if there are currently no tasks assigned to the hardware accelerator, the controller can turn off each of the power domains in the DPE array so that each DPE in the array is deactivated.

Figure 6:
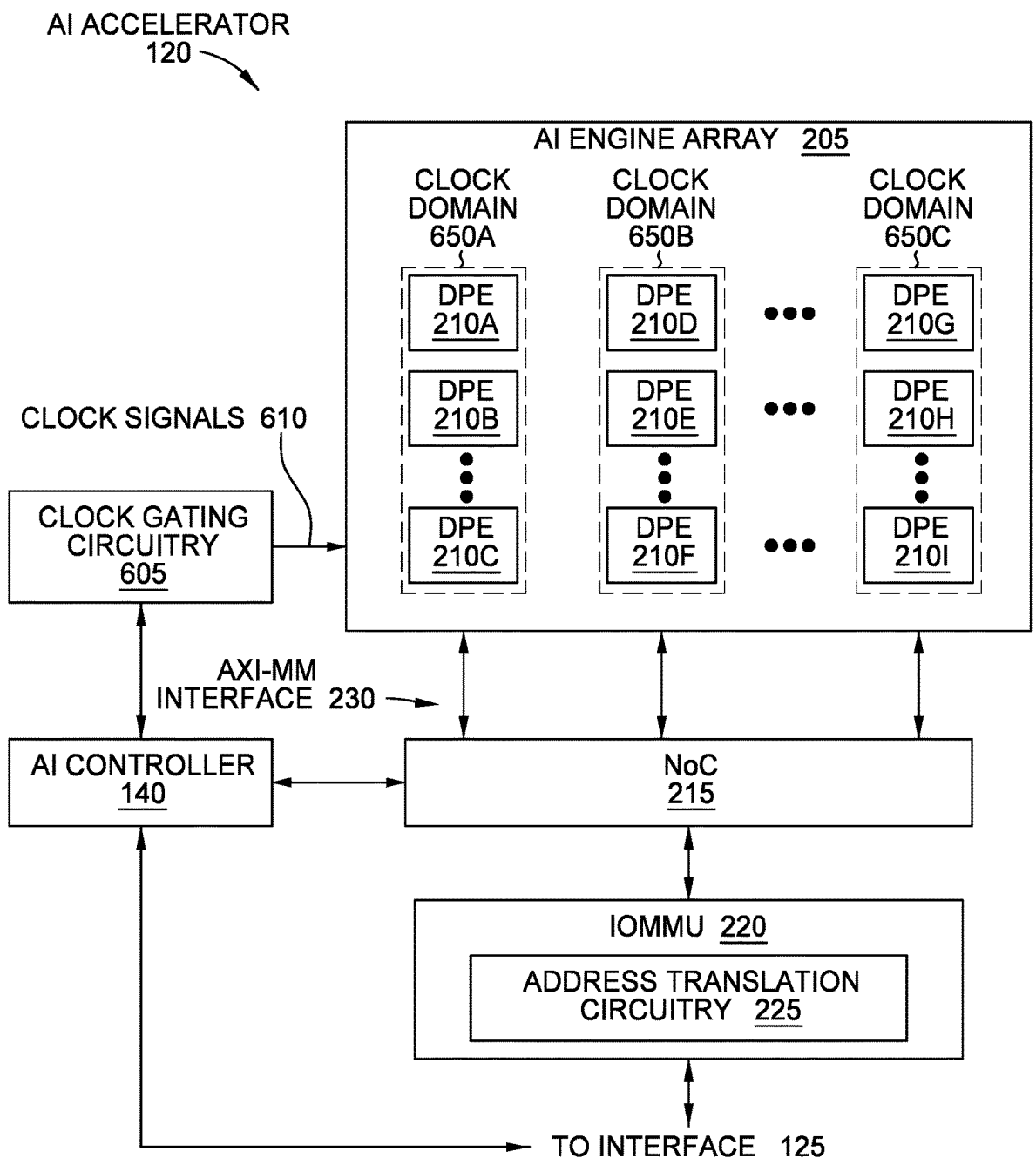
FIG. 6 illustrates an AI accelerator with different clock domains, according to an example.

FIG. 6 illustrates an AI accelerator with different clock domains, according to an example. FIG. 6 has many of the same components as shown in in FIG. 2, which is indicated by using the same reference numbers.

In this implementation of the AI accelerator 120, the DPEs are arranged in different clock domains 650. As shown, each column of DPEs 210 is disposed in a different clock domain 650. That is, the first column of DPEs 210 is in clock domain 650A, the second column of DPEs 210 is in the clock domain 650B, and the last column of DPEs 210 is in the clock domain 650C. Placing the columns in different clock domains 650 results in the AI controller 140 being able to selectively deactivate the DPEs 210 in each of the clock domains 650 by performing clock gating. For example, the AI accelerator 120 may currently be tasked with performing an AI task that uses the DPEs 210A-F in the first two columns but does not use the DPEs 210G-I in the last column. The AI controller 140 (or some other logic in the SoC, such as the CPU) can instruct clock gating circuitry 605 to gate the clock for the clock domain 650C since those DPEs 210G-I are idle. This conserves power in the AI accelerator 120. The clock gating circuitry 605 does not gate (i.e., does not block) the clock for the clock domains 650A and 650B so that the DPEs 210A-F remain operational and can perform the AI task.

Clock gating is a power-saving feature in semiconductor electronics that enables switching off circuits. As shown, the clock gating circuitry 605 provides clock signals 610 to the different clock domains 650A-C. For example, the clock gating circuitry 605 may provide a first clock signal for clock domain 650A, a second clock signal for clock domain 650B, and so forth. When the DPEs 210 in a clock domain 650 are idle, the clock gating circuitry 605 removes (gates or blocks) the clock signal, which saves power by pruning a clock tree in the hardware accelerator 120. This prevents the circuitry in the DPEs 210 from switching states, which consumes power. By gating specific clock signals, the clock gating circuitry 605 can deactivate subsets of the DPEs in the clock domains 650 to conserve power in the hardware accelerator 120.

While FIG. 6 illustrates grouping the DPEs 210 in the same column in the same clock domain, this is just one example. In other examples, the DPEs in two columns, three columns, etc. may be grouped in the same clock domain. In another example, the DPEs 210 in the same row (or adjacent rows) may be grouped in the same clock domain. In yet another example, blocks of DPEs that includes DPEs from multiple columns and rows (e.g., 2×2 blocks of DPEs, or 3×3 blocks of DPEs) may be assigned to different clock domains.

Further, while an AI accelerator 120 is shown, any type of accelerator (e.g., cryptography accelerator or compression accelerator) that has an array of DPEs 210 can assign the DPEs 210 into different clock domains as shown. Thus, the embodiments herein are not limited to AI accelerator and can apply to any type of accelerator with DPEs.

Further, the other circuitry in the AI accelerator 120, such as the NoC 215, AI controller 140, and the IOMMU 220 may be in the same or different clock domains. The clock gating circuitry 605 can gate the clocks to the clock domains to prevent these components from switching states, thereby conserving power.

Figure 7:
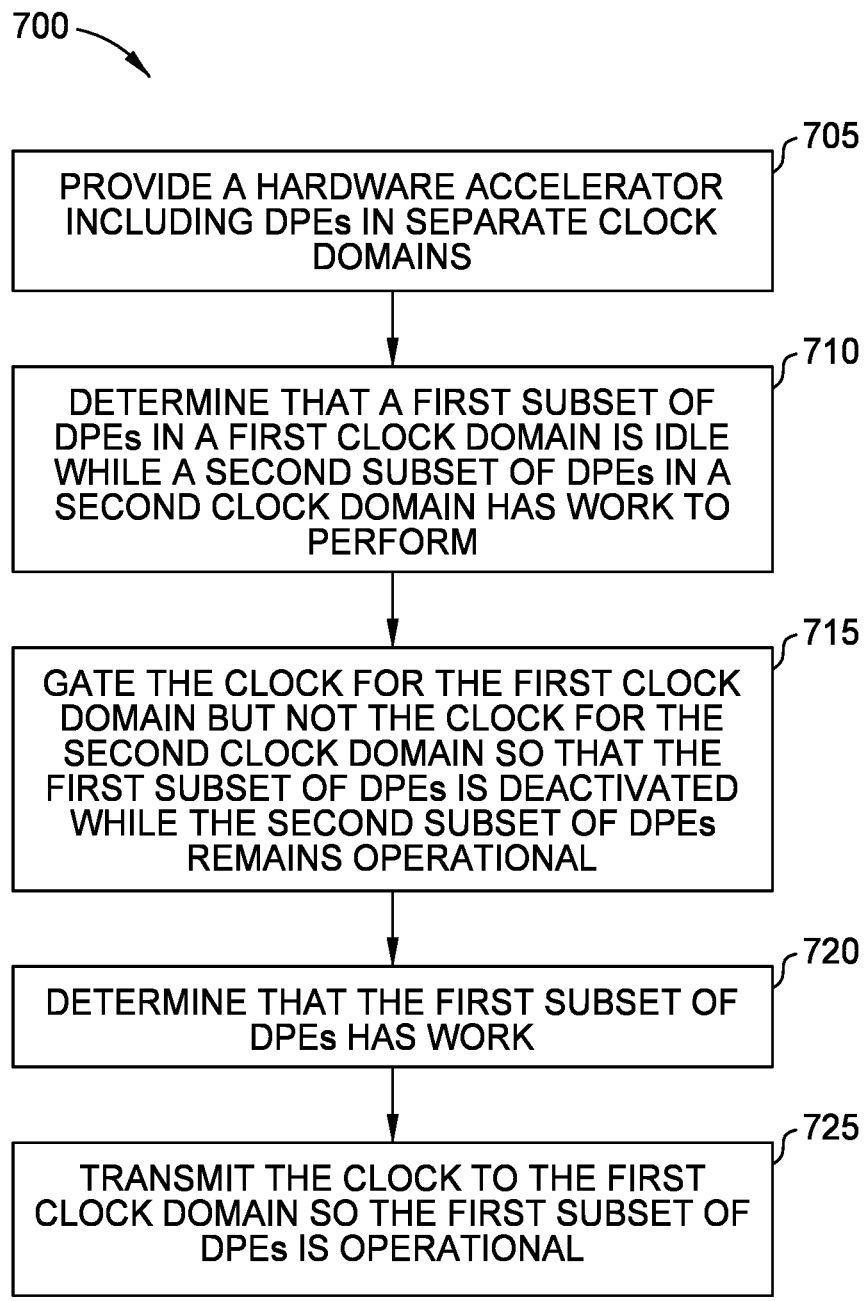
FIG. 7 illustrates a workflow for operating clock domains in a hardware accelerator, according to an example.

FIG. 7 illustrates a workflow of a method 700 for operating clock domains in a hardware accelerator, according to an example. At block 705, a hardware accelerator (e.g., the AI accelerator 120 in FIG. 6) is provided that includes DPEs in separate clock domains. Because the DPEs are in a separate clock domains, subsets of DPEs can be deactivated while other subsets of DPEs can remain operational. The subsets of DPEs (which are each disposed in a different clock domain) can each include one column of DPEs, multiple adjacent columns of DPEs, one row of DPEs, multiple adjacent rows of DPEs, blocks of DPEs which includes adjacent DPEs from multiple columns and rows, and the like.

At block 710, the controller in the hardware accelerator (or a CPU or other logic in the same IC as the accelerator) determines that a first subset of DPEs is idle while a second subset of DPEs in a second clock domain has work to perform. For example, the hardware accelerator may currently be processing a task for the CPU that does not require all the DPEs to perform. For example, an AI task may need to use only half of the DPE array, or a task may be a relatively light-weight task that does not need the full compute power of the DPE array. Thus, the controller may determine that only a portion of the DPEs in the array will be used to perform the task. As such, at least one subset of the DPEs will be idle while another subset of the DPEs will perform the work.

At block 715, the controller instructs clock gating circuitry (e.g., the clock gating circuitry 605 in FIG. 6) to gate the clock for the first clock domain but not the clock for the second clock domain so that the first subset of DPEs is disabled while the second subset of DPEs remains operational. This conserves power in the hardware accelerator while permitting the hardware accelerator to still perform the assigned task. While method 700 describes gating one clock domain, any number of clock domains can be gated in parallel. For example, if the task requires only half of the DPEs to perform and the DPE array includes four clock domains containing equal numbers of DPEs, the controller can used the clock gating circuitry to gate two of the clock domains while the other two clock domains receive clock signals.

At block 720, the controller determines that the first subset of DPEs have work. For example, the CPU may send a new accelerator task to the controller that requires the first subset and the second subset of the DPEs to complete.

At block 725, the clock gating circuitry transmits the clock to the first clock domain so the first subset of DPEs is operational. Put differently, the controller instructs the clock gating circuitry to stop gating the clock signal for the first clock domain so that the clock signal is received by the first subset of DPEs. The first subset and the second subset of the DPEs are then able to perform the work assigned by the CPU. For example, the controller may orchestrate the DPEs in order to perform the task assigned by the CPU. In this manner, different subsets of the DPEs in the DPE array can be clock gated when idle but then receive a clock signal when new work is assigned to the hardware accelerator.

Further, if there are currently no tasks assigned to the hardware accelerator, the controller can clock gate each of the clock domains in the DPE array so that each DPE in the array is deactivated.

Figure 8:
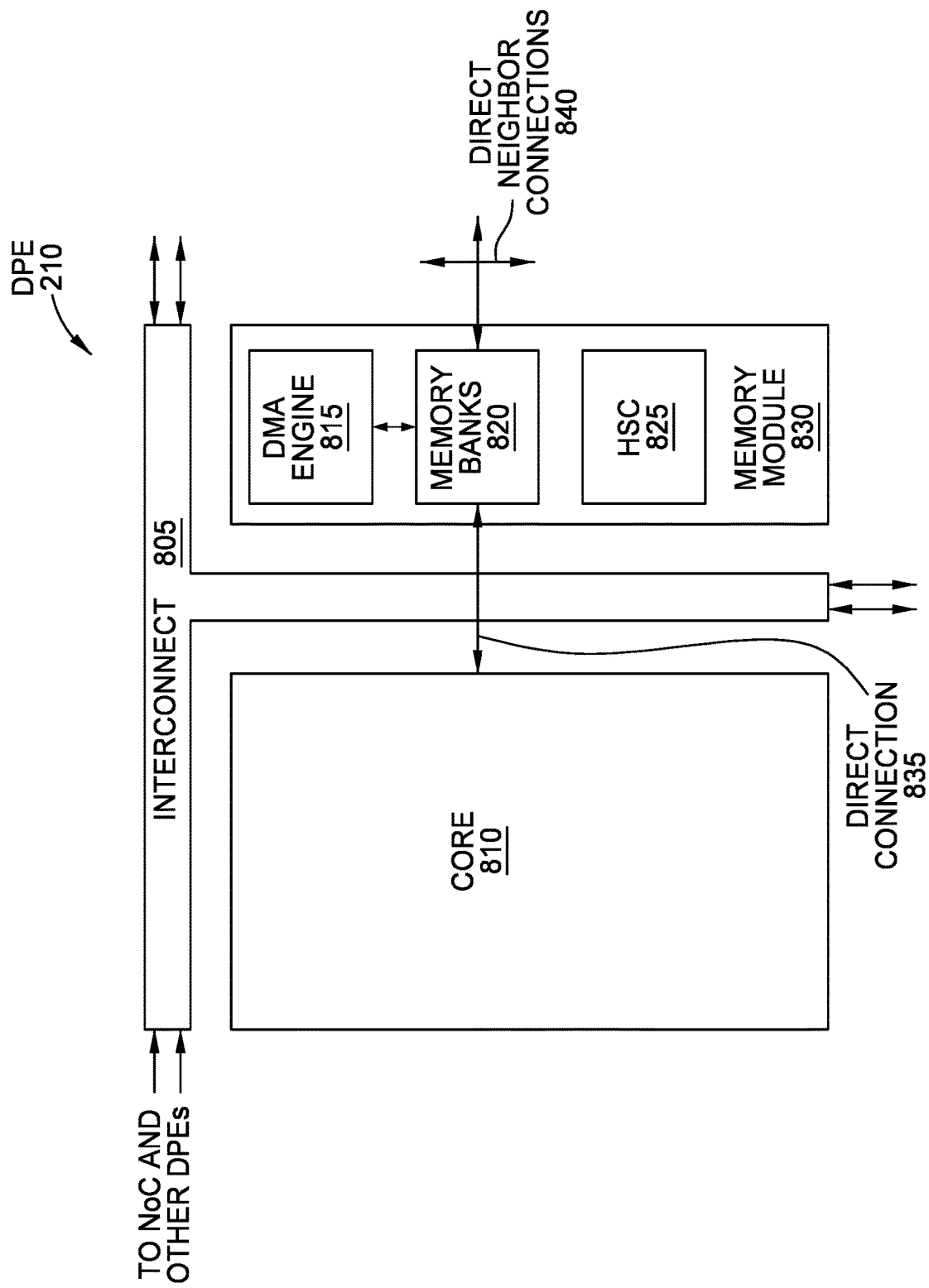
FIG. 8 is a block diagram of a data processing engine, according to an example.

FIG. 8 is a block diagram of a data processing engine, according to an example. FIG. 8 is a block diagram of a DPE 210 in the AI engine array 205 illustrated in FIG. 2, according to an example. The DPE 210 includes an interconnect 805, a core 810, and a memory module 830. The interconnect 805 permits data to be transferred from the core 810 and the memory module 830 to different cores in the array. That is, the interconnect 805 in each of the DPEs 210 may be connected to each other so that data can be transferred north and south (e.g., up and down) as well as east and west (e.g., right and left) between the DPEs 210 in the array.

For example, the DPEs 210 in an upper row of the array rely on the interconnects 805 in the DPEs 210 in a lower row to communicate with the NoC 215 shown in FIG. 2. For example, to transmit data to the NoC, a core 810 in a DPE 210 in the upper row transmits data to its interconnect 805 which is in turn communicatively coupled to the interconnect 805 in the DPE 210 in the lower row. The interconnect 805 in the lower row is connected to the NoC. The process may be reversed where data intended for a DPE 210 in the upper row is first transmitted from the NoC to the interconnect 805 in the lower row and then to the interconnect 805 in the upper row that is the target DPE 210. In this manner, DPEs 210 in the upper rows may rely on the interconnects 805 in the DPEs 210 in the lower rows to transmit data to and receive data from the NoC.

In one embodiment, the interconnect 805 includes a configurable switching network that permits the user to determine how data is routed through the interconnect 805. In one embodiment, unlike in a packet routing network, the interconnect 805 may form streaming point-to-point connections. That is, the streaming connections and streaming interconnects (not shown in FIG. 2) in the interconnect 805 may form routes from the core 810 and the memory module 830 to the neighboring DPEs 210 or the NoC. Once configured, the core 810 and the memory module 830 can transmit and receive streaming data along those routes. In one embodiment, the interconnect 805 is configured using the AXI Streaming protocol. However, when communicating with the NoC, the DPEs 210 may use the AXI MM protocol.

In addition to forming a streaming network, the interconnect 805 may include a separate network for programming or configuring the hardware elements in the DPE 210. Although not shown, the interconnect 805 may include a memory mapped interconnect (e.g., AXI MM) which includes different connections and switch elements used to set values of configuration registers in the DPE 210 that alter or set functions of the streaming network, the core 810, and the memory module 830.

In one embodiment, streaming interconnects (or network) in the interconnect 805 support two different modes of operation referred to herein as circuit switching and packet switching. In one embodiment, both of these modes are part of, or compatible with, the same streaming protocol—e.g., an AXI Streaming protocol. Circuit switching relies on reserved point-to-point communication paths between a source DPE 210 to one or more destination DPEs 210. In one embodiment, the point-to-point communication path used when performing circuit switching in the interconnect 805 is not shared with other streams (regardless whether those streams are circuit switched or packet switched). However, when transmitting streaming data between two or more DPEs 210 using packet-switching, the same physical wires can be shared with other logical streams.

The core 810 may include hardware elements for processing digital signals. For example, the core 810 may be used to process signals related to wireless communication, radar, vector operations, machine learning applications, and the like. As such, the core 810 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 210. The hardware elements in the core 810 may change depending on the engine type. That is, the cores in an AI engine, digital signal processing engine, cryptographic engine, or FEC may be different.

The memory module 830 includes a DMA engine 815, memory banks 820, and hardware synchronization circuitry (HSC) 825 or other type of hardware synchronization block. In one embodiment, the DMA engine 815 enables data to be received by, and transmitted to, the interconnect 805. That is, the DMA engine 815 may be used to perform DMA reads and write to the memory banks 820 using data received via the interconnect 805 from the NoC or other DPEs 210 in the array.

The memory banks 820 can include any number of physical memory elements (e.g., SRAM). For example, the memory module 830 may be include 4, 8, 16, 32, etc.

different memory banks 820. In this embodiment, the core 810 has a direct connection 835 to the memory banks 820. Stated differently, the core 810 can write data to, or read data from, the memory banks 820 without using the interconnect 805. That is, the direct connection 835 may be separate from the interconnect 805. In one embodiment, one or more wires in the direct connection 835 communicatively couple the core 810 to a memory interface in the memory module 830 which is in turn coupled to the memory banks 820.

In one embodiment, the memory module 830 also has direct connections 840 to cores in neighboring DPEs 210. Put differently, a neighboring DPE in the array can read data from, or write data into, the memory banks 820 using the direct neighbor connections 840 without relying on their interconnects or the interconnect 805 shown in FIG. 8. The HSC 825 can be used to govern or protect access to the memory banks 820. In one embodiment, before the core 810 or a core in a neighboring DPE can read data from, or write data into, the memory banks 820, the core (or the DMA engine 815) requests a lock acquire to the HSC 825 when it wants to read or write to the memory banks 820 (i.e., when the core/DMA engine want to "own" a buffer, which is an assigned portion of the memory banks 820. If the core or DMA engine does not acquire the lock, the HSC 825 will stall (e.g., stop) the core or DMA engine from accessing the memory banks 820. When the core or DMA engine is done with the buffer, they release the lock to the HSC 825. In one embodiment, the HSC 825 synchronizes the DMA engine 815 and core 810 in the same DPE 210 (i.e., memory banks 820 in one DPE 210 are shared between the DMA engine 815 and the core 810). Once the write is complete, the core (or the DMA engine 815) can release the lock which permits cores in neighboring DPEs to read the data.

Because the core 810 and the cores in neighboring DPEs 210 can directly access the memory module 830, the memory banks 820 can be considered as shared memory between the DPEs 210. That is, the neighboring DPEs can directly access the memory banks 820 in a similar way as the core 810 that is in the same DPE 210 as the memory banks 820. Thus, if the core 810 wants to transmit data to a core in a neighboring DPE, the core 810 can write the data into the memory bank 820. The neighboring DPE can then retrieve the data from the memory bank 820 and begin processing the data. In this manner, the cores in neighboring DPEs 210 can transfer data using the HSC 825 while avoiding the extra latency introduced when using the interconnects 805. In contrast, if the core 810 wants to transfer data to a non-neighboring DPE in the array (i.e., a DPE without a direct connection 840 to the memory module 830), the core 810 uses the interconnects 805 to route the data to the memory module of the target DPE which may take longer to complete because of the added latency of using the interconnect 805 and because the data is copied into the memory module of the target DPE rather than being read from a shared memory module.

In addition to sharing the memory modules 830, the core 810 can have a direct connection to cores 810 in neighboring DPEs 210 using a core-to-core communication link (not shown). That is, instead of using either a shared memory module 830 or the interconnect 805, the core 810 can transmit data to another core in the array directly without storing the data in a memory module 830 or using the interconnect 805 (which can have buffers or other queues). For example, communicating using the core-to-core communication links may use less latency (or have high bandwidth) than transmitting data using the interconnect 805 or shared memory (which requires a core to write the data and then another core to read the data) which can offer more cost effective communication. In one embodiment, the core-to-core communication links can transmit data between two cores 810 in one clock cycle. In one embodiment, the data is transmitted between the cores on the link without being stored in any memory elements external to the cores 810. In one embodiment, the core 810 can transmit a data word or vector to a neighboring core using the links every clock cycle, but this is not a requirement.

In one embodiment, the communication links are streaming data links which permit the core 810 to stream data to a neighboring core. Further, the core 810 can include any number of communication links which can extend to different cores in the array. In this example, the DPE 210 has respective core-to-core communication links to cores located in DPEs in the array that are to the right and left (east and west) and up and down (north or south) of the core 810. However, in other embodiments, the core 810 in the DPE 210 illustrated in FIG. 8 may also have core-to-core communication links to cores disposed at a diagonal from the core 810. Further, if the core 810 is disposed at a bottom periphery or edge of the array, the core may have core-to-core communication links to only the cores to the left, right, and bottom of the core 810.

However, using shared memory in the memory module 830 or the core-to-core communication links may be available if the destination of the data generated by the core 810 is a neighboring core or DPE. For example, if the data is destined for a non-neighboring DPE (i.e., any DPE that DPE 210 does not have a direct neighboring connection 840 or a core-to-core communication link), the core 810 uses the interconnects 805 in the DPEs to route the data to the appropriate destination. As mentioned above, the interconnects 805 in the DPEs 210 may be configured when the SoC is being booted up to establish point-to-point streaming connections to non-neighboring DPEs to which the core 810 will transmit data during operation.

Figure 9:
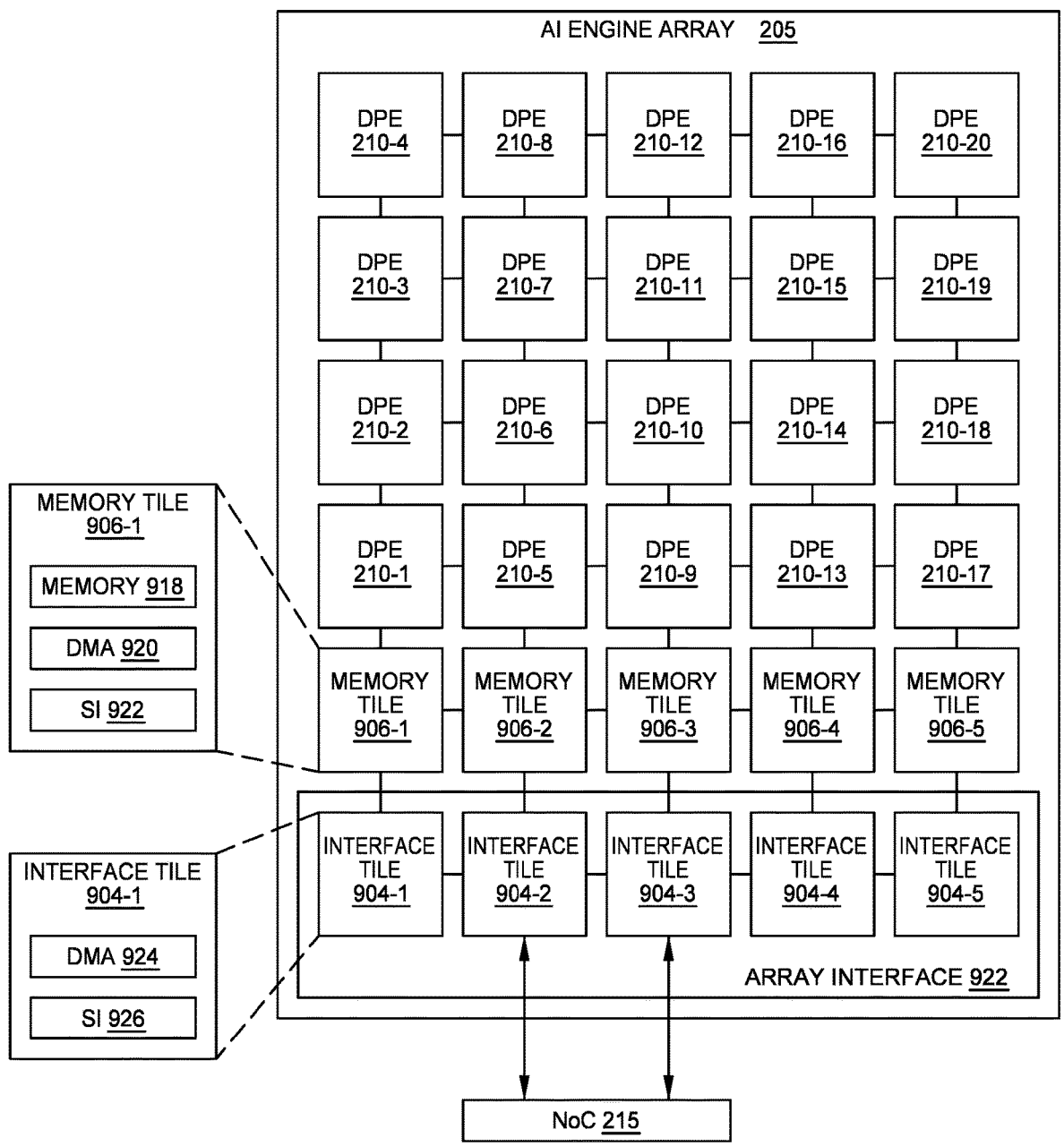
FIG. 9 is a block diagram of an AI engine array, according to an example.

FIG. 9 is a block diagram of an AI engine array 205, according to an example. In this example, AI engine array 205 includes a plurality of circuit blocks, or tiles, illustrated here as the DPEs 210 (also referred to as DPE tiles or compute tiles), interface tiles 904, and memory tiles 906. Memory tiles 906 may be referred to as shared memory and/or shared memory tiles. Interface tiles 904 may be referred to as shim tiles, and may be collectively referred to as an array interface 928. Like in FIG. 2, the AI engine array 205 is coupled to the NoC 215. FIG. 9 further illustrates that the interface tiles 904 communicatively couple the other tiles in the AI engine array 205 (i.e., the DPEs 210 and memory tiles 906) to the NoC 215.

In one embodiment, the AI engine array 205 can include multiple power or clock domains. For example, each column (or a group of adjacent columns) of DPEs 210, Memory tile 206, and interface tile 904 can be in separate power/clock domain. For example, the DPEs 210-1-4, the memory tile 906-1, and the interface tile 904-1 may be in a first power/clock domain while the DPEs 210-5-8, the memory tile 906-2, and the interface tile 904-2 may be in a second power/clock domain, and so forth. In another example, each row (or a group of adjacent rows) may be in the same power/clock domain. For example, the DPEs 210 may be in a first power/clock domain, the memory tiles 906 may be in a second power/clock domain, and the interface tiles 904 may be in a third power/clock domain.

In another example, each column (or a group of adjacent columns) of DPEs 210 and Memory tile 206 may be in a separate power/clock domain, while the row of interface tiles 904 are in a separate power/clock domain. For example, the DPEs 210-1-4 and the memory tile 906-1 may be in a first power/clock domain while the DPEs 210-5-8 and the memory tile 906-2 2 may be in a second power/clock domain, and so forth. The row of interface tiles 904-1-5 may be in their own power/clock domain.

DPEs 210 can include one or more processing cores, program memory (PM), data memory (DM), DMA circuitry, and stream interconnect (SI) circuitry, which are also described in FIG. 8. For example, the core(s) is the DPEs 210 can execute program code stored in the PM. The core(s) may include, without limitation, a scalar processor and/or a vector processor. DM may be referred to herein as local memory or local data memory, in contrast to the memory tiles which have memory that is external to the DPE tiles, but still within the AI engine array 205.

The core(s) may directly access data memory of other DPE tiles via DMA circuitry. The core(s) may also access DM of adjacent (or neighboring) DPEs 210 via DMA circuitry and/or DMA circuitry of the adjacent compute tiles. In one embodiment, DM in one DPE 210 and DM of adjacent DPE tiles may be presented to the core(s) as a unified region of memory. In one embodiment, the core(s) in one DPE 210 may access data memory of non-adjacent DPEs 210. Permitting cores to access data memory of other DPE tiles may be useful to share data amongst the DPEs 210.

The AI engine array 205 may include direct core-to-core cascade connections (not shown) amongst DPEs 210. Direct core-to-core cascade connections may include unidirectional and/or bidirectional direct connections. Core-to-core cascade connections may be useful to share data amongst cores of the DPEs 210 with relatively low latency (e.g., the data does not traverse stream interconnect circuitry such as the interconnect 805 in FIG. 8, and the data does not need to be written to data memory of an originating DPE and read by a recipient or destination DPE). For example, a direct core-to-core cascade connection may be useful to provide results from an accumulation register of a processing core of an originating DPE directly to a processing core(s) of a destination DPE.

In an embodiment, DPEs 210 do not include cache memory. Omitting cache memory may be useful to provide predictable/deterministic performance. Omitting cache memory may also be useful to reduce processing overhead associated with maintaining coherency among cache memories across the DPEs 210.

In an embodiment, processing cores of the DPE 210 do not utilize input interrupts. Omitting interrupts may be useful to permit the processing cores to operate uninterrupted. Omitting interrupts may also be useful to provide predictable and/or deterministic performance.

One or more DPEs 210 may include special purpose or specialized circuitry, or may be configured as special purpose or specialized compute tiles such as, without limitation, digital signal processing engines, cryptographic engines, forward error correction (FEC) engines, and/or artificial intelligence (AI) engines.

In an embodiment, the DPEs 210, or a subset thereof, are substantially identically to one another (i.e., homogenous compute tiles). Alternatively, one or more DPEs 210 may differ from one other more other DPEs 210 (i.e., heterogeneous compute tiles).

Memory tile 906-1 includes memory 918 (e.g., random access memory or RAM), DMA circuitry 920, and stream interconnect (SI) circuitry 922.

Memory tile 906-1 may lack or omit computational components such as an instruction processor. In an embodiment, memory tiles 906, or a subset thereof, are substantially identical to one another (i.e., homogenous memory tiles). Alternatively, one or more memory tiles 906 may differ from one other more other memory tiles 906 (i.e., heterogeneous memory tiles). A memory tile 906 may be accessible to multiple DPEs 210. Memory tiles 906 may thus be referred to as shared memory.

Data may be moved between/amongst memory tiles 906 via DMA circuitry 920 and/or stream interconnect circuitry 922 of the respective memory tiles 906. Data may also be moved between/amongst data memory of a DPE 210 and memory 918 of a memory tile 906 via DMA circuitry and/or stream interconnect circuitry of the respective tiles. For example, DMA circuitry in a DPE 210 may read data from its data memory and forward the data to memory tile 906-1 in a write command, via stream interconnect circuitry in the DPE 210 and stream interconnect circuitry 922 in the memory tile 906. DMA circuitry 924 of memory tile 906-1 may then write the data to memory 918. As another example, DMA circuitry 920 of memory tile 906-1 may read data from memory 918 and forward the data to a DPE 210 in a write command, via stream interconnect circuitry 922 and stream interconnect circuitry in the DPE 210, and DMA circuitry in the DPE 210 can write the data to its data memory.

Array interface 928 interfaces between the AI engine array 205 (e.g., DPEs 210 and memory tiles 906) and the NoC 215. Interface tile 904-1 includes DMA circuitry 924 and stream interconnect circuitry 926. Interface tiles 904 may be interconnected so that data may be propagated amongst interface tiles 904 bi-directionally. An interface tile 904 may operate as an interface for column of DPEs 210 (e.g., as an interface to the NoC 215). Interface tiles 904 may be connected such that data may be propagated from one interface tile 904 to another interface tile 904 bi-directionally.

In an embodiment, interface tiles 904, or a subset thereof, are substantially identically to one another (i.e., homogenous interface tiles). Alternatively, one or more interface tiles 904 may differ from one other more other interface tiles 904 (i.e., heterogeneous interface tiles).

In an embodiment, one or more interface tiles 904 is configured as a NoC interface tile (e.g., as master and/or slave device) that interfaces between the DPEs 210 and the NoC 215 (e.g., to access other components in the SoC). While FIG. 9 illustrates coupling a subset of the interface tiles 904 to the NoC 215, in one embodiment, each of the interface tiles 904-1-5 is connected to the NoC 215. Doing so may permit different applications to control and use different columns of the memory tiles 906 and DPEs 210.

DMA circuitry and stream interconnect circuitry of the AI engine array 205 may be configurable/programmable to provide desired functionality and/or connections to move data between/amongst DPEs 210, memory tiles 906, and the NoC 215. The DMA circuitry and stream interconnect circuitry of the AI engine array 205 may include, without limitation, switches and/or multiplexers that are configurable to establish signal paths within, amongst, and/or between tiles of the AI engine array 205. The AI engine array 205 may further include configurable AXI interface circuitry. The DMA circuitry, the stream interconnect circuitry, and/or AXI interface circuitry may be configured or programmed by storing configuration parameters in configuration registers, configuration memory (e.g., configuration random access memory or CRAM), and/or eFuses, and coupling read outputs of the configuration registers, CRAM, and/or eFuses to functional circuitry (e.g., to a control input of a multiplexer or switch), to maintain the functional circuitry in a desired configuration or state. In an embodiment, the core(s) of DPEs 210 configure the DMA circuitry and stream interconnect circuitry of the respective DPEs 210 based on core code stored in PM of the respective DPEs 210. A controller (not shown) can configure DMA circuitry and stream interconnect circuitry of memory tiles 906 and interface tiles 904 based on controller code.

The AI engine array 205 may include a hierarchical memory structure. For example, data memory of the DPEs 210 may represent a first level (L1) of memory, memory 918 of memory tiles 906 may represent a second level (L2) of memory, and external memory outside the AI engine array 205 may represent a third level (L3) of memory. Memory capacity may progressively decrease with each level (e.g., memory 918 of memory tile 906 may have more storage capacity than data memory in the DPEs 210, and external memory may have more storage capacity than data memory 918 of the memory tiles 906). The hierarchical memory structure is not, however, limited to the foregoing examples.

As an example, an input tensor may be relatively large (e.g., 1 megabyte or MB). Local data memory in the DPEs 210 may be significantly smaller (e.g., 64 kilobytes or KB). The controller may segment an input tensor and store the segments in respective blocks of shared memory tiles 906.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A system on a chip (SoC), comprising:
   at least one central processing unit (CPU);
   a hardware accelerator comprising data processing engines (DPEs), wherein a first subset of the DPEs is in a first power or clock domain and a second subset of the DPEs is in a second power or clock domain, wherein the SoC is configured to deactivate the first power or clock domain to disable the first subset of DPEs while the second power or clock domain remains active so that the second subset of DPEs remains operational, wherein the hardware accelerator further comprises:
   a controller;
   a network on chip (NoC); and
   an Input-Output Memory Management Unit (IOMMU) comprising circuitry configured to perform a physical to virtual address translation, wherein the IOMMU is coupled to the DPEs via the NoC; and
   an interface communicatively coupling the CPU to the hardware accelerator.

2. The SoC of claim 1, wherein, when the first power or clock domain is disabled and the second power or clock domain is active, the first subset of DPEs cannot perform any tasks while the second subset of DPEs performs a task assigned by the CPU.

3. The SoC of claim 2, wherein the SoC is configured to deactivate both the first and second power or clock domains to disable both the first and second subsets of DPEs when there are no tasks assigned to the hardware accelerator by the CPU.

4. The SoC of claim 1, wherein the IOMMU is configured to translate virtual addresses used by the hardware accelerator to physical addresses used by the CPU before transmitting data from the hardware accelerator to the interface.

5. The SoC of claim 1, wherein the first power or clock domain is a first power domain and the second power or clock domain is a second power domain, wherein the SoC is configured to turn off the first power domain when the first subset of DPEs is idle and keep the second power domain turned on when the second subset of DPEs has work to perform.

6. The SoC of claim 1, wherein the first power or clock domain is a first clock domain and the second power or clock domain is a second clock domain, wherein the hardware accelerator comprises clock gating circuitry configured to clock gate the first clock domain when the first subset of DPEs is idle and transmit a clock signal to the second clock domain when the second subset of DPEs has work to perform.

7. The SoC of claim 1, wherein the first subset of DPEs is in a first column of an array comprising the DPEs and the second subset of DPEs is in a second column of the array, wherein the first subset of DPEs are not in the second column and the second subset of DPEs are not in the first column.

8. The SoC of claim 1, wherein the first subset of DPEs is in a first row of an array comprising the DPEs and the second subset of DPEs is in a second row of the array, wherein the first subset of DPEs are not in the second row and the second subset of DPEs are not in the first row.

9. The SoC of claim 1, wherein each of the DPEs comprises a core, a memory module, and an interconnect, wherein the interconnects in the DPEs are interconnected so that the DPEs are able to transmit data between each other.

10. The SoC of claim 1, wherein the hardware accelerator is at least one of an artificial intelligence (AI) accelerator, a cryptography accelerator, or a compression accelerator.

11. A method, comprising:
    in response to a first subset of a plurality of DPEs in a hardware accelerator being idle, wherein the first subset of DPEs is in a first power or clock domain and a second subset of the plurality of DPEs is in a second power or clock domain, deactivating the first power or clock domain but not the second power or clock domain so that the first subset of DPEs is disabled but the second subset of DPEs remains operational;
    after deactivating the first power or clock domain, in response to the first subset of DPEs having work, activating the first power or clock domain so the first subset of DPEs is operational to perform the work; and
    performing a physical to virtual address translation using circuitry in an Input-Output Memory Management Unit (IOMMU) in the hardware accelerator, wherein the IOMMU is coupled to the DPEs via a network on chip (NoC) in the hardware accelerator.

12. The method of claim 11, wherein, when the first power or clock domain is disabled and the second power or clock domain is active, the first subset of DPEs cannot perform any tasks while the second subset of DPEs performs a task assigned by a CPU.

13. The method of claim 12, further comprising:
    deactivating both the first and second power or clock domains to disable both the first and second subsets of DPEs when there are no tasks assigned to the hardware accelerator by the CPU.

14. The method of claim 11, wherein the first power or clock domain is a first power domain and the second power or clock domain is a second power domain, wherein deactivating the first power or clock domain comprises:
    turning off the first power domain when the first subset of DPEs is idle and keeping the second power domain turned on when the second subset of DPEs has work to perform.

15. The method of claim 11, wherein the first power or clock domain is a first clock domain and the second power or clock domain is a second clock domain, wherein deactivating the first power or clock domain comprises:
clock gating the first clock domain when the first subset of DPEs is idle and transmitting a clock signal to the second clock domain when the second subset of DPEs has work to perform.

16. A system, comprising:
an IC, comprising:
a hardware accelerator comprising an array of DPEs, wherein a first subset of the DPEs is in a first power or clock domain and a second subset of the DPEs is in a second power or clock domain, wherein the IC is configured to deactivate the first power or clock domain to disable the first subset of DPEs while the second power or clock domain remains active so that the second subset of DPEs remains operational, wherein the hardware accelerator further comprises:
a controller;
a network on chip (NoC); and
an Input-Output Memory Management Unit (IOMMU) comprising circuitry configured to perform a physical to virtual address translation, wherein the IOMMU is coupled to the DPEs via the NoC, and
a memory controller; and
at least one memory coupled to the memory controller in the IC.

17. The system of claim 16, wherein the first power or clock domain is a first power domain and the second power or clock domain is a second power domain, wherein the IC is configured to turn off the first power domain when the first subset of DPEs is idle and keep the second power domain turned on when the second subset of DPEs has work to perform.

18. The system of claim 17, wherein the first power or clock domain is a first clock domain and the second power or clock domain is a second clock domain, wherein the hardware accelerator comprises clock gating circuitry configured to clock gate the first clock domain when the first subset of DPEs is idle and transmit a clock signal to the second clock domain when the second subset of DPEs has work to perform.

19. The system of claim 16, wherein each of the DPEs comprises a core, a memory module, and an interconnect, wherein the interconnects in the DPEs are interconnected so that the DPEs are able to transmit data between each other.

* * * * *